Patented Aug. 30, 1932

1,875,187

UNITED STATES PATENT OFFICE

LOUIS VEZEKENYI, OF CLEVELAND, OHIO

METHOD FOR PRODUCING AN ARTIFICIAL WOOD COMPOSITION

No Drawing.    Application filed October 12, 1927.   Serial No. 225,855.

My invention relates to the manufacture of an artificial wood composition, and more particularly to a cold process of making an artificial wood composition of substantial strength and durability in a rapid and economical way and in different forms and complex shapes. In practicing I have found that some of the ingredients must be mixed in a certain sequence to effect a chemical reaction in order to produce a product possessing the desired qualities and properties, all as hereinafter shown and described and more particularly pointed out in the claims. The composition comprises sawdust 62 parts, glue 13.5 parts, alum 0.5 parts, borax 0.5 parts, zinc oxide or lead oxide 0.5 parts, carbolic acid or sodium fluoride 0.5 parts, chromic acid 0.5 parts, water approximately 22 parts.

These ingredients are mixed in the following way, say in preparing a batch of 100 pounds of materials. Thus, the first step consists in dissolving one-half pound powdered borax and one-half pound powdered alum in sufficient water (say 1 pound or pint) of room temperature to form a thin liquid, of milk-like consistency and appearance. This liquid may be referred to as the borax-alum mixture. As the next step one-half pound zinc oxide or one-half pound lead oxide is added to one-half pound or pint of water of room temperature to provide a second mixture, which may be termed the zinc oxide and water mixture. These two independent mixtures are then mixed together to produce a combination of value and utility for further admixture with other ingredients. Thus, in mixing the borax-alum solution with the zinc oxide and water mixture a chemical reaction is noted by the self-working of the materials and by the heat generated for an interval. The combined mixture —C— is now poured into a cold glue solution of 13.5 pounds glue and 19.5 pounds water, and thoroughly stirred to produce a fourth compound which is thicker and flows less freely than the previous mixtures. I then mix one half-pound chromic acid, one-half pound carbolic acid, and one pound water thoroughly, and pour the same into the fourth compound, whereupon I add sawdust in preponderating amount, say 68 pounds of sawdust to a mixture composed as stated. The whole substance is then and for a short period rapidly mixed and stirred up in a mechanical mixing device. This stirring operation is preferably of very short duration, say from 5 to 30 seconds. If unduly prolonged the materials heat up excessively and the water content evaporates, the final product is not as homogeneous or strong, and a heavier pressure is required to form a finished product. Apparently the materials are slightly heated by chemical reactions of the ingredients present during the brief mechanical mixing process. The substance or composition obtained by the steps described is spongy and has fluffy qualities and is slightly sticky when compressed in and by the hand. Its appearance is like wet sawdust and has no tendency to stick together like dough, rather the particles will spread like wet sand when thrown to the floor. After having been cooled off to room temperature, which takes from 5 to 20 minutes, the composition is ready for use, filled into dies, and subjected to a pressure of about 60 to 260 pounds per square inch, for a short interval, one-half to one minute, depending upon the pressure areas of the dies. The compressed product may be removed immediately and very readily from the dies, and the product has a solid homogeneous body which is slightly resilient and elastic, but which hardens rapidly upon exposure to a dry atmosphere. It may even be roughly treated without damage to appearance and form and even dropped to the floor as soon as removed from the dies, like soft rubber. To completely harden the pressed product it may be subjected to a drying process lasting from three to five days at about 70 to 90 degrees F. During such drying process the article will shrink and lose about 20 to 21 per cent of its weight, amounting to about the whole water content which the article possesses when it is removed from the dies.

The dry product may be finished, sawed, shaved drilled, etc. in the same manner as natural wood, and it will not crack as the material is fully homogeneous and without grain. The sequence of the steps described during the mixture of the different ingredients has been found to be necessary for the best results. A slightly inferior product may be produced by shifting some of the steps, but the steps of mixing the borax and alum separately and then with zinc or lead oxide is deemed essential to produce a homogeneous product of exceptional good quality and strength.

The carbolic acid may be substituted by an equal amount of sodium fluoride, but I prefer carbolic acid, as the product is of better quality and more easily mixed. Sodium fluoride necessitates special treatment, while the carbolic acid may be handled more readily.

What I claim, is:

1. A method for producing an artificial wood composition, consisting in making a thin solution of alum and borax; in mixing said solution with a zinc oxide and water mixture; in adding a carbolic acid and chromic acid solution; in mixing the whole mixture with a viscous glue solution; in adding sawdust to the mixture and in mixing all said ingredients for a relatively short period.

2. A method for producing an artificial wood composition article, consisting in making a thin solution of alum and borax, in mixing said solution with a zinc oxide and water mixture, in adding carbolic acid and chromic acid solution, in mixing the whole mixture with a viscous glue solution, in adding sawdust to the mixture, in mixing all said ingredients for a relatively short period, in subjecting the resulting mixture for a short interval to a pressure of about 60—260 pounds per square inch, and in drying the formed product.

3. A method for producing an artificial wood composition, consisting in making a thin solution of alum and borax, in mixing said solution with a zinc oxide and water mixture, in adding a solution of carbolic acid, chromic acid and glue, and in adding sawdust and mixing the mixture for a period of five to thirty seconds.

4. A method of producing a compressible artificial wood composition, consisting in dissolving equal parts of borax and alum in substantially two parts of water, in mixing one part of zinc oxide in substantially an equal part of water, in mixing the said solution and mixture, in adding to the foregoing mixture a glue solution of approximately 27 parts of glue and 39 parts of water, in adding a solution of approximately 1 part chromic acid and 1 part carbolic acid and two parts water, in adding a preponderating amount of sawdust, and in mixing the said materials rapidly for a short interval.

5. An artificial wood composition as described, made from a mixture of 62% sawdust, 13½% glue, .5% borax, .5% alum, .5% zinc oxide, .5% chromic acid, .5% carbolic acid, and 22% water.

In testimony whereof I affix my signature.

LOUIS VEZEKENYI.